(12) United States Patent
Graziado et al.

(10) Patent No.: US 7,634,548 B2
(45) Date of Patent: Dec. 15, 2009

(54) DISTRIBUTED SERVICE DELIVER MODEL

(75) Inventors: Bradley John Graziado, Redmond, WA (US); Ganesh Pandy, Kirkland, WA (US); Douglas Shawn Cavit, Arlington, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 11/097,764

(22) Filed: Apr. 2, 2005

(65) Prior Publication Data

US 2006/0224736 A1    Oct. 5, 2006

(51) Int. Cl.
*G06F 15/16* (2006.01)

(52) U.S. Cl. .................. 709/219; 709/217; 709/218; 709/225

(58) Field of Classification Search .......... 709/217, 709/218, 219, 225; 726/2, 4, 10
See application file for complete search history.

(56) References Cited

U.S. PATENT DOCUMENTS

| | | | | |
|---|---|---|---|---|
| 6,182,142 | B1* | 1/2001 | Win et al. | 709/229 |
| 6,269,456 | B1 | 7/2001 | Hodges | |
| 6,321,263 | B1* | 11/2001 | Luzzi et al. | 709/224 |
| 6,668,322 | B1* | 12/2003 | Wood et al. | 713/182 |
| 7,107,366 | B2* | 9/2006 | Cheng et al. | 710/36 |
| 2001/0044894 | A1* | 11/2001 | Saito et al. | 713/156 |
| 2002/0196741 | A1* | 12/2002 | Jaramillo et al. | 370/252 |
| 2003/0144969 | A1* | 7/2003 | Coyne | 705/400 |
| 2003/0149781 | A1* | 8/2003 | Yared et al. | 709/229 |
| 2005/0081062 | A1* | 4/2005 | Patrick et al. | 713/201 |
| 2005/0203968 | A1* | 9/2005 | Dehghan et al. | 707/203 |
| 2005/0228874 | A1* | 10/2005 | Edgett et al. | 709/220 |
| 2007/0143390 | A1* | 6/2007 | Giambalvo et al. | 709/200 |
| 2007/0180490 | A1* | 8/2007 | Renzi et al. | 726/1 |

OTHER PUBLICATIONS

Office Action dated Jan. 8, 2008 cited in related U.S. Appl. No. 11/097,763.
Flurry et al., "The IBM Framework for E-Business", IBM System Journal, vol. 40, No. 1, 2001.
Office Action dated Jul. 22, 2008 cited in related U.S. Appl. No. 11/097,763.
Bhoj et al., "Management of New Federated Services", HPL-96-131, Sep. 1996, Hewlett-Packard Company.
Office Action dated Dec. 24, 2008 cited in U.S. Appl. No. 11/097,763.

* cited by examiner

*Primary Examiner*—William C Vaughn, Jr.
*Assistant Examiner*—Boris Gorney
(74) *Attorney, Agent, or Firm*—Workman Nydegger

(57) ABSTRACT

A root silo that authorizes one or more clients to access one or more services at one or more servicing silos receives a request from a client for interaction with a service. The root silo identifies a servicing silo as an available provider of the service for interacting with the client and generates a servicing certificate that contains (i) service entitlement information showing that the client is entitled to interact with the service at the servicing silo, (ii) location information identifying a location of the servicing silo, and (iii) one or more keys for use in secure communication between the client and the servicing silo. Having generated the servicing certificate, the root silo sends the servicing certificate to the client for the client to use when interacting with the service at the servicing silo.

19 Claims, 5 Drawing Sheets

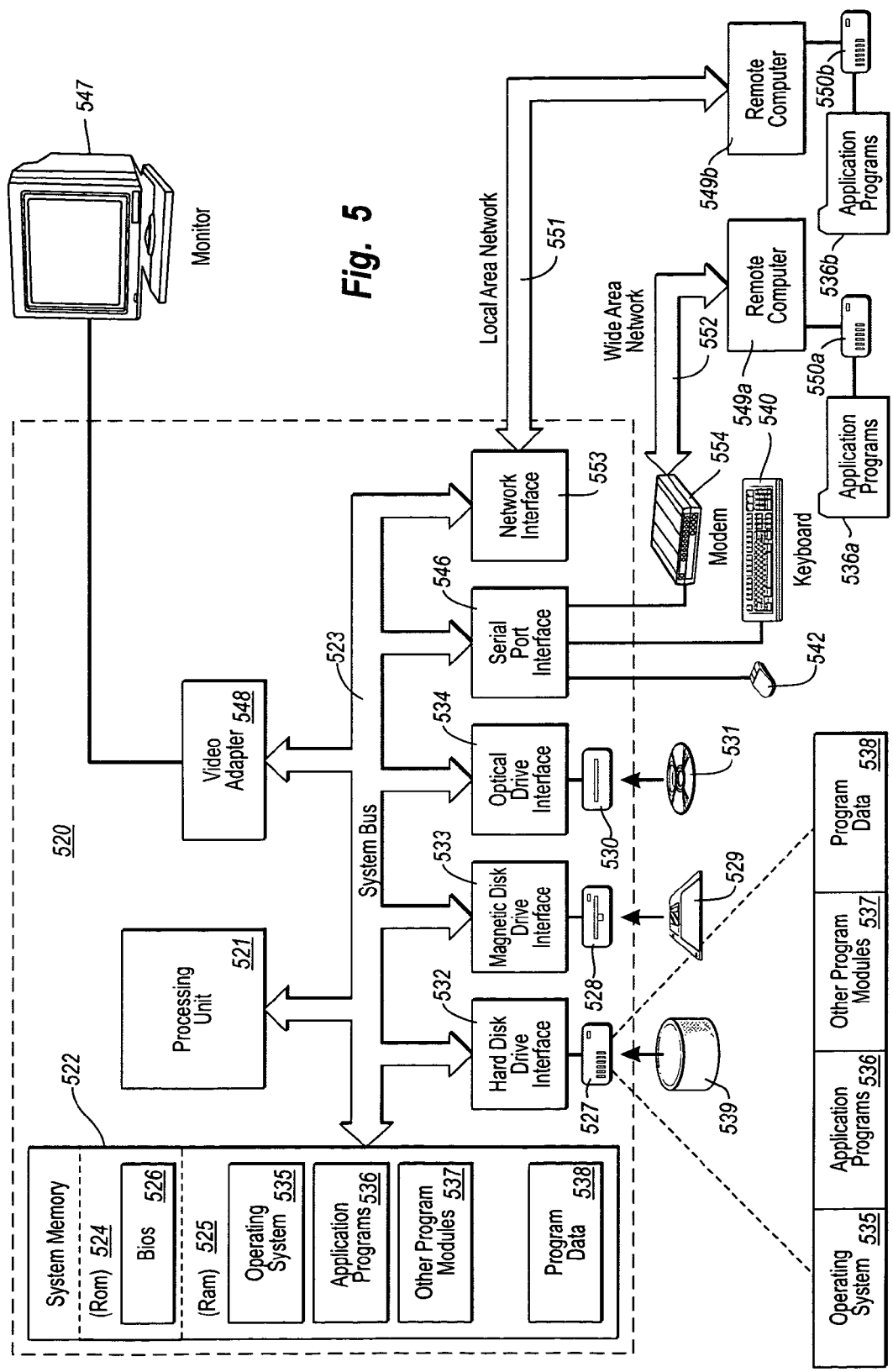

DISTRIBUTED SERVICE DELIVER MODEL

CROSS-REFERENCE TO RELATED APPLICATIONS

N/A

BACKGROUND OF THE INVENTION

1. The Field of the Invention

The present invention relates to a distributed service delivery model. More specifically, the present invention relates to a distributed service delivery model, including machine level provisioning and servicing, with improved reliability/availability and scalability that allows for personally identifiable information to be separated from servicing information.

2. Background and Related Art

Often, conventional distributed service delivery models include a centralized authorization/registration component and one or more service components that provide the desired services. One problem with this approach is that it mixes the most sensitive data, personally identifiable information ("PII") related to registration activities and billing related information, for example, with service related data and processing. (It should be understood that personally identifiable information is a broad term, encompassing data from which an individual may be identified. Examples of PII include name, address, phone number, credit card number, email address, demographic information, other subscriptions, subscription history and so forth.) Mixing sensitive data with service related data and processing represents a tangible security risk.

However, separating more sensitive PII data from service data and processing introduces problems of its own. For example, reliability/availability becomes an issue because the authorization/registration component is interlinked with the service provider. Problems with the authorization/registration component cause problems at the service provider. In other words, interlinking the service provider with the authorization/registration component increases the likelihood of a service failure because a failure in either the authentication component or the service provider leads to the service provider being inaccessible.

Similarly, scalability also becomes an issue because the authorization/registration component provides authorization/registration for all client interaction with the service provider. As a result, access to the service provider is limited by the authorization/registration component's ability to authorize and/or register clients, in what is essentially a one-to-one relationship. The one-to-one relationship may be amplified where only a single authorization/registration component exists for more than one service.

Accordingly, methods, systems, and computer program products for a distributed service delivery model in which a service provider of a desired service may be identified and a client may be entitled to interact with the service, without the client being required to authenticate to an authorization component each time the client wishes to interact with the service.

BRIEF SUMMARY OF THE INVENTION

The present invention relates to methods, systems, and computer program products for a distributed service delivery model in which a service provider of a desired service may be identified and a client may be entitled to interact with the service, without the client being required to authenticate to an authorization component each time the client interacts with the service.

In accordance with an example method embodiment of the present invention, a root silo that authorizes one or more clients to access one or more services at one or more servicing silos receives a request from a client for interaction with a service. As used in this application, the term "client" is to be interpreted broadly to encompass a user, a computer, a user at a computer, and so forth. The root silo identifies a servicing silo as an available provider of the service for interacting with the client and generates a servicing certificate that contains (i) service entitlement information showing that the client is entitled to interact with the service at the servicing silo, (ii) location information identifying a location of the servicing silo, and (iii) one or more keys for use in secure communication between the client and the servicing silo. Having generated the servicing certificate, the root silo sends the servicing certificate to the client for the client to use when interacting with the service at the servicing silo.

The servicing certificate may contain expiration information defining a term during which the client is authorized to interact with the service. The request from the client for interaction with the service may be an initial request for interaction with the service or a renewal of an expired term. The request may include at least some personally identifiable information needed from the client in order to interact with the service, which the root silo may store and use in connection with billing for the client's interaction with the service.

In some embodiments, a plurality of servicing silos provide the service, and the servicing silo may be identified as an available provider of the service based at least in part on the geographic location of the client and/or servicing silo.

A client may be moved from one servicing silo to another by the root silo generating a new servicing certificate that contains (i) service entitlement information showing that the client is entitled to interact with the service at a new servicing silo, (ii) location information identifying a location of the new servicing silo, and (iii) one or more keys for use in secure communication between the client and the new servicing silo; and sending the new servicing certificate to the client for the client to use when interacting with the service at the new servicing silo, in order to move the client from the current servicing silo to the new servicing silo.

In accordance with an example computer program product embodiment of the present invention, a client desiring to interact with a service directs a request for interaction with a service to a root silo responsible for authorizing access to the service and acquires a servicing certificate from the root silo that contains (i) service entitlement information showing that the client is entitled to interact with the service at the servicing silo, (ii) location information identifying a location of the servicing silo, and (iii) one or more keys for use in secure communication between the client and the servicing silo. The client then directs a request to the servicing silo for interaction with the service using the location information in the servicing certificate acquired from the root silo, provides at least the entitlement information to the servicing silo to show that the client is entitled to interact with the service at the servicing silo, and interacts with the service at the servicing silo.

The client may receive client configuration information from the servicing silo in order to configure the client for interaction with the servicing silo. Interacting with the service at the servicing silo may comprise the client sending client telemetry data to the service for analysis. For example, the service may comprise an antivirus service, and interacting with the service may comprise updating antivirus software located at the client or initially installing the antivirus software at the client. The service may include multiple service levels, and the servicing certificate may contain an identifier for a particular service level to which the client is entitled.

The servicing certificate may contain expiration information, and the request to the root silo for interaction with the service may comprise a request to renew the servicing certificate in order to extend the expiration information. Alternatively, the request to the root silo for interaction with the service may comprise an initial request for access to the service. The one or more keys contained within the servicing certificate may comprise a public/private key pair.

In accordance with an example service provider embodiment of the present invention, a servicing silo that provides one or more services to one or more clients comprises a network interface for communicating with the one or more clients and one or more computer readable media with computer executable instructions. The computer executable instructions comprise computer executable instructions for receiving provisioning data created by the root silo indicating that a client is authorized to interact with a service at the servicing silo, the provisioning data being received from the client and computer executable instructions for receiving a servicing certificate created by the root silo, the servicing certificate containing (i) service entitlement information showing that the client is entitled to interact with the service at the servicing silo, (ii) location information identifying a location of the servicing silo, and (iii) one or more keys for use in secure communication between the client and the servicing silo. The computer executable instructions further comprise computer executable instructions for implementing at least a portion of the service and computer executable instructions for interacting with the client in accordance with the service. The servicing silo also includes a processing unit coupled to the network connection and the one or more computer readable media for sending and receiving data over the network connection and for executing the computer executable instructions.

The computer executable instructions of the servicing silo also may comprise computer executable instructions for receiving telemetry data from the client, computer executable instructions for aggregating the telemetry data, and computer executable instructions for forwarding the aggregated telemetry data to an administrative silo 205 for analysis. The telemetry data may be formatted in XML and signed by at least one of the one or more keys to show that the telemetry data was sent by the client. Telemetry data is a broad term used to describe information about the state or condition of a client.

The servicing silo may include computer executable instructions for providing a machine view of the telemetry data received from the client. In some embodiments the computer executable instructions of the servicing silo include computer executable instructions for associating a third party support entity with the client, computer executable instructions for analyzing the telemetry data, and computer executable instructions for notifying the third party support entity of one or more support issues identified while analyzing the telemetry data.

Additionally, the servicing silo may include computer executable instructions for sending broadcast messages to a plurality of clients authorized to interact with the service, and/or computer executable instructions for sending targeted messages to one or more individual clients authorized to interact with the service.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims and this description. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 5 illustrates an example computer system that provides a suitable operating environment for embodiments of the present invention.

DETAILED DESCRIPTION OF THE PREFERRED EMBODIMENTS

The present invention relates to methods, systems, and computer program products for a distributed service delivery model in which a service provider of a desired service may be identified and a client may be entitled to interact with the service, without the client being required to authenticate to an authentication component each time the client interacts with the service.

I. Overview

Figure 1:
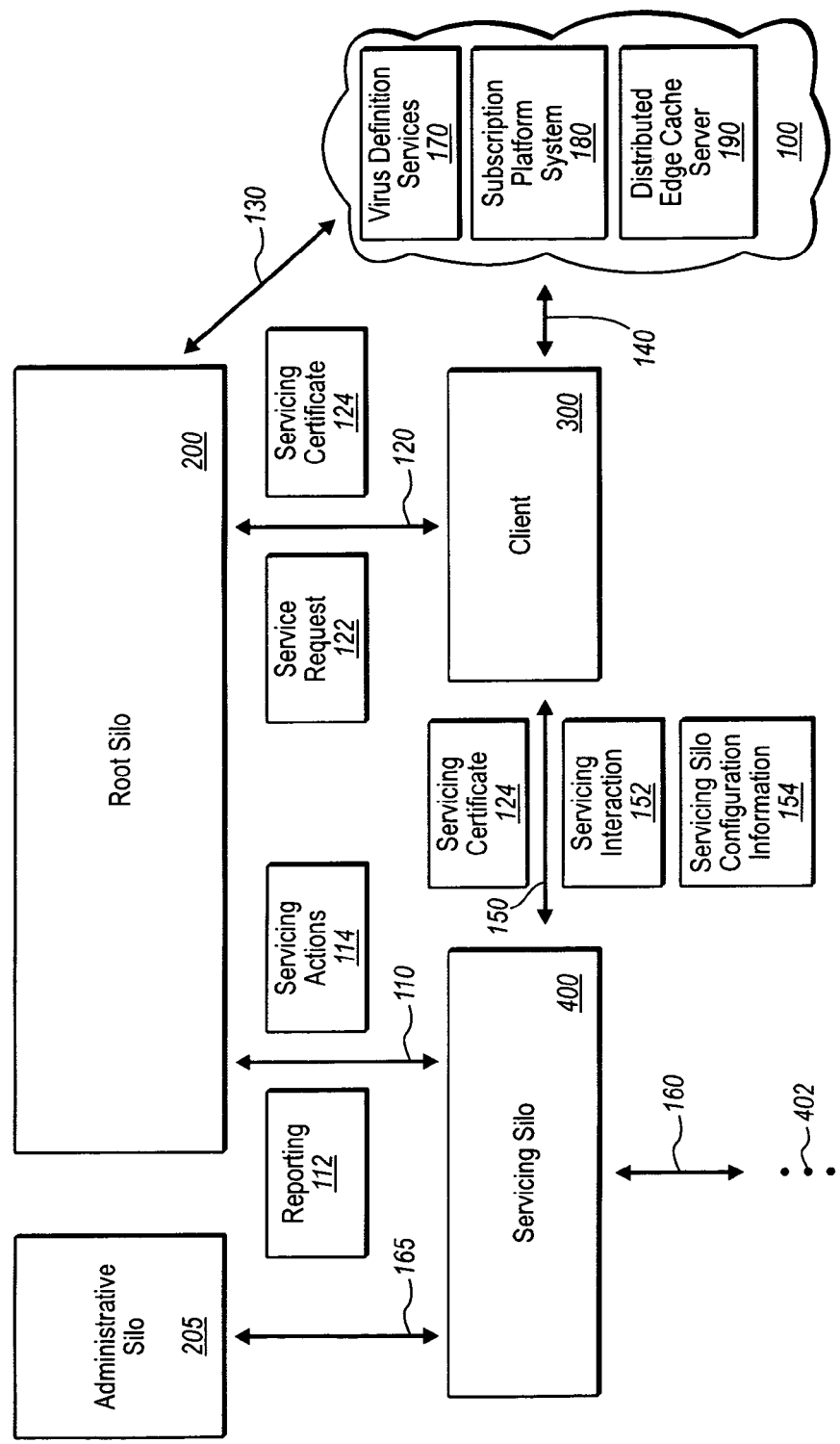
FIG. 1 illustrates an example distributed service delivery environment modeled in accordance with the present invention.

FIG. 1 illustrates an example distributed service delivery environment modeled in accordance with the present invention. The description of FIG. 1 begins with a high-level introduction of the components that make up the distributed service delivery model, followed by a description of how the components interact with each other. Further detail with respect to these components and their interactions is given in connection with FIGS. 2-4.

The example distributed service delivery environment illustrated in FIG. 1 includes a network cloud 100, root silo 200, a client 300, and one or more servicing silos 400, 402, all communicating over network connections 110, 120, 130, 140, 150, 160, and 165. The design provides for scaling and operating a highly distributed service delivery environment over a network, such as the Internet, and allows for a high level of reliability by minimizing the need for communication between service components. In terms of scale, the design facilitates the hosting of multiple service instances, which as described in greater detail below, can be used to scale-up system capacity or to federate a service across multiple service providers. The model also provides a mechanism for separating personally identifiable information (PII) from day-to-day servicing information.

Root silo 200 provides entitlement, provisioning, and PII storage services for the entire client base. Servicing silo 400 provides the day-to-day service interactions with clients and provides storage for servicing related data. Client 300, as entitled and provisioned by root silo 200, is serviced on a day-to-day basis through servicing silo 400. An administrative feature, which may be integrated with the root silo or implemented as a separate silo, determines day-to-day service operation and provides an aggregated view of the overall service status.

A servicing certificate 124 contains service entitlement information, information to identify the location of an assigned servicing silo, and one or more keys, such as a public/private key pair, for secure communication between the client, the root silo, and the servicing silo. A set of inter-silo communication channels 110 and 160 allow the servicing silos and the root silo to communicate with each other. Servicing silo configuration information 154 allows the servicing silo to configure the client side of a service. Servicing actions 114 provide basic management capabilities for operating the overall system.

A. Separation of Personally Identifiable Information and Servicing Related Data One guiding principle behind the distributed service delivery model of the present invention is the separation of systems that process personally identifiable information ("PII") related to registration and/or billing activities from servicing related data and processing. From a data perspective, the most sensitive data, especially billing related information, is kept within the root silo 200, which is responsible for registration, entitlement, and billing services. In contrast, the day-to-day servicing of a client is performed by a servicing silo 400, which includes activities such as managing client updates, processing client telemetry and providing web related interfaces for viewing a client's status. Depending on the desired scale, multiple servicing silos may be operated with the single root silo being responsible for provisioning or assigning clients to a specific servicing silo.

A multiple servicing silo design supports at least three scenarios: scaling-out, geographical distribution, and OEM or other federation. Scaling-out relates to having multiple servicing silos within a single data center or geographical location. Geographical distribution relates to having geographically diverse servicing silos, some of which also may be scaled-out. Federation relates to having diverse operators responsible for the servicing silos, some of which may be geographically diverse and/or scaled-out. Of course, none of these scenarios is mutually exclusive, and other scenarios are possible depending on the goals and requirement for a particular implementation.

B. Messaging Design

Because the design allows for multiple servicing silos, attention is given to the operational dependencies between the root silo and the servicing silos as well as silo-to-silo dependencies. In other words, to achieve a high level of reliability, transactions should not span multiple silos. Servicing silo 400, for example, should not need to contact the root silo 200 for an entitlement check before granting access to a service at the servicing silo. In order to meet this design goal, the client acts as a hub for communication and carries or stores all of its configuration and entitlement information.

In one embodiment, messages are eXtensible Markup Language ("XML") messages supported by a public key infrastructure ("PKI") system that provides security and entitlement. In other words, silos communicate via signed XML messages, with the client acting as a go-between when needed, with most transactions being asynchronous. In addition, the client 300 maintains a digital certificate, in servicing certificate(s) db 340 (see FIG. 3), that was issued by the root and identifies the servicing silo to which the client is assigned as well as the services to which it has access or with which the client may interact. The PKI system allows both the clients and silos to validate messages to ensure they are authentic. Authenticity is important particularly for sensitive messages, like configuration changes, end-user targeted communications, and re-provisioning changes.

C. Client, Root Silo, and Servicing Silo Interaction

Embodiments of the present invention may be described in terms of methods comprising functional steps and/or non-functional acts. The following is a description of acts and steps that may be performed in practicing the present invention as outlined in connection with the various disclosed embodiment. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Servicing silo 400 is registered as a potential provider of one or more services for clients. Once registered, servicing silo 400 is managed within the overall distributed service delivery environment through servicing actions 114, and root silo 200 is in a position to begin assigning clients to the servicing silo for the services it provides.

Client 300 directs a request 122 to the root silo 200 for interaction with a service. Directing a request may include generating the request and sending it to the root silo 200. The root silo 200 receives the request from the client 300 and identifies servicing silo 400 as an available provider of the service. Where multiple servicing silos are capable of providing the service, a particular servicing silo may be identified, based at least in part, on the geographic location of the client and/or the servicing silo. Alternatively, the client 300 may express a preference for a particular servicing silo, perhaps where multiple entities are responsible for providing the service and the client has, an existing relationship, more confidence in, or some other motivation for preferring a particular servicing silo. The preference also could be based on client hardware and/or software, such as in identifying a particular servicing silo that is associated with an OEM for or reseller of the hardware and/or software.

The request may represent an initial request for interaction with the service or represent a request to renew interaction with the service that has expired. For example, the request may be to interact with some antivirus software in order to protect the client-either to install the antivirus software initially, update previously installed antivirus software, or renew a subscription for antivirus software updates that is expired or that will expire in the future.

Client 300 also may provide PII to the root silo 200, which the root silo receives, and may store and use, for example, in billing for the client's interaction with the service. Providing PII to the root silo 200 may include collecting the PII and sending it to the root silo.

Root silo 200 generates a servicing certificate 124 that contains (i) service entitlement information showing that the client is entitled to interact with the service at the identified servicing silo, (ii) location information identifying the location of the servicing silo, the location information could include, for example, an address or uniform resource locator, and (iii) one or more keys, such as a private/public key pair, for use in secure communication between the client 300, the servicing silo 400, and/or the root silo 200. The servicing certificate also may contain expiration information defining a term during which the client is authorized to interact with the service.

For services that include multiple service levels or tiers, the servicing certificate may contain an identifier for a particular service level or tier to which the client is entitled. For instance, with reference to the antivirus software example given above, a variety of levels and/or types of protection may be available (antivirus, spyware, firewalls, etc.), and the particular level of interaction allowed by the servicing certificate may be identified as a service level or tier within the antivirus service.

Root silo 200 sends the servicing certificate 124 to the client for the client to use when interacting with the service at the servicing silo 400. The client 300 acquires the servicing certificate 124 from the root silo 200 and directs a request to the servicing silo 400 for interaction with the service using the location information in the servicing certificate. Acquiring the servicing certificate 124 may include receiving the servicing certificate from the root silo 200, and directing a request to the servicing silo 400 may include generating the request and sending it to the servicing silo 400.

The client 300 provides at least the entitlement information to the servicing silo 400 to show that the client is entitled to interact with the service at the servicing silo, and then interacts 152 with the service at the servicing silo. Providing at least the entitlement information to the servicing silo 400 may include gathering the entitlement information from the servicing certificate and sending the entitlement information to the servicing silo. Alternatively, the client may simply send the entire servicing certificate 124 to the servicing silo 400.

Interaction with the servicing silo 400 may include receiving configuration information 154 from the servicing in order to configure the client for interacting with the servicing silo. Interaction with the servicing silo 400 also may include sending client telemetry data to the service at the servicing silo for analysis. Telemetry data is a broad term used to describe information about the state or condition of the client, and may include, for example, such things as an operating system version, whether antivirus software is running and if so when the antivirus software was last updated, were any threats detected and if so were the threats cleaned successfully, whether backups are being performed at the client, whether firewall protection is enabled at the client, when the last software update was applied, particular events generated by client components, error conditions encountered by client software, unhandled issues related to particular client features (i.e. new backup file extensions), startup time of the system, last defragmentation of hard drive, and so forth.

At times, it may be necessary to move a client 300 from one servicing silo to another, such as because the servicing silo is not operating accordingly to agreed standards or as part of a redistribution based on the availability of new servicing silos, etc. When moving a client 300, the root server 200 generates a new servicing certificate that, similar to the prior servicing certificate, contains (i) service entitlement information showing that the client is entitled to interact with the service at the new servicing silo, (ii) location information identifying the location of the new servicing silo, and (iii) one or more keys for using in secure communication between the client, the new servicing silo, and the root silo. The root server 200 sends the new servicing certificate to the client for the client to use when interacting with the service at the new servicing silo, in order to move the client from the prior servicing silo to the new servicing silo.

The servicing silo 400 receives, through the client 300, provisioning data created by the root silo 200 so that the servicing silo can allocate and initialize storage for the client. The servicing silo 400 also receives at least a portion of the servicing certificate. Servicing silo 400 may send broadcast message to multiple clients authorized to interact with a service at the servicing silo and may send targeted messages to one or more individual clients.

When the servicing silo 400 receives telemetry data from the client 300, the servicing silo may aggregate the telemetry data and forward or report 112 the aggregated telemetry data to an administrative silo 205 for analysis. The telemetry data received from the client 300 may be formatted in eXtensible Markup Language ("XML") and signed by at least one of the one or more keys to show that the telemetry data was sent by the client. The servicing silo 400 may provide a machine view of the telemetry data received from the client for access by others. Furthermore, the servicing silo 400 may associate a third party support entity with the client, analyze the telemetry data received, and notify the third party support entity of one or more support issues identified while analyzing the telemetry data. For example, the telemetry data may indicate a performance or security issue at the client that should be remedied.

It should be noted that not all servicing information is necessarily kept at the servicing silo 400. For scale, performance, and availability reasons, certain types of content may be stored on one or more cached download servers, such as distributed edge cache server 190 or virus definition service 170, across a network cloud, such as the Internet. This architecture is fairly common and used by services that provide a significant volume of downloads, such as services for updating an operating system with patches. The content also may include client install and update bits, antivirus signatures, firewall policies, etc. One benefit that a distributed edge cache server 190 offers is that it allows an operating system vendor to maintain control over certain aspects of the client, when an OEM is hosting the servicing silo, in order to assure a consistent level of service for all customers. It also eliminates the potential threat of a rogue servicing silo delivering malicious or out-of-date content related to the operating system.

The network cloud 100 also may include subscription platform system 180 for billing activities in cooperation with root silo 200.

Embodiments of the present invention also may comprise one or more special purpose and/or one or more general purpose computers including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection or interface (either hardwired, wireless, or a combination of hardwired or wireless) to a computer, the computer properly views the connection or interface as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

In addition to those embodiments specifically described, the present invention may be embodied in other specific forms without departing from its spirit or essential characteristics. The described example embodiments are to be considered in all respects only as illustrative and not restrictive. The scope of the invention is, therefore, indicated by the appended claims rather than by this description. All changes which come within the meaning and range of equivalency of the claims are to be embraced within their scope.

II. Example Root Silo Components

Figure 2:
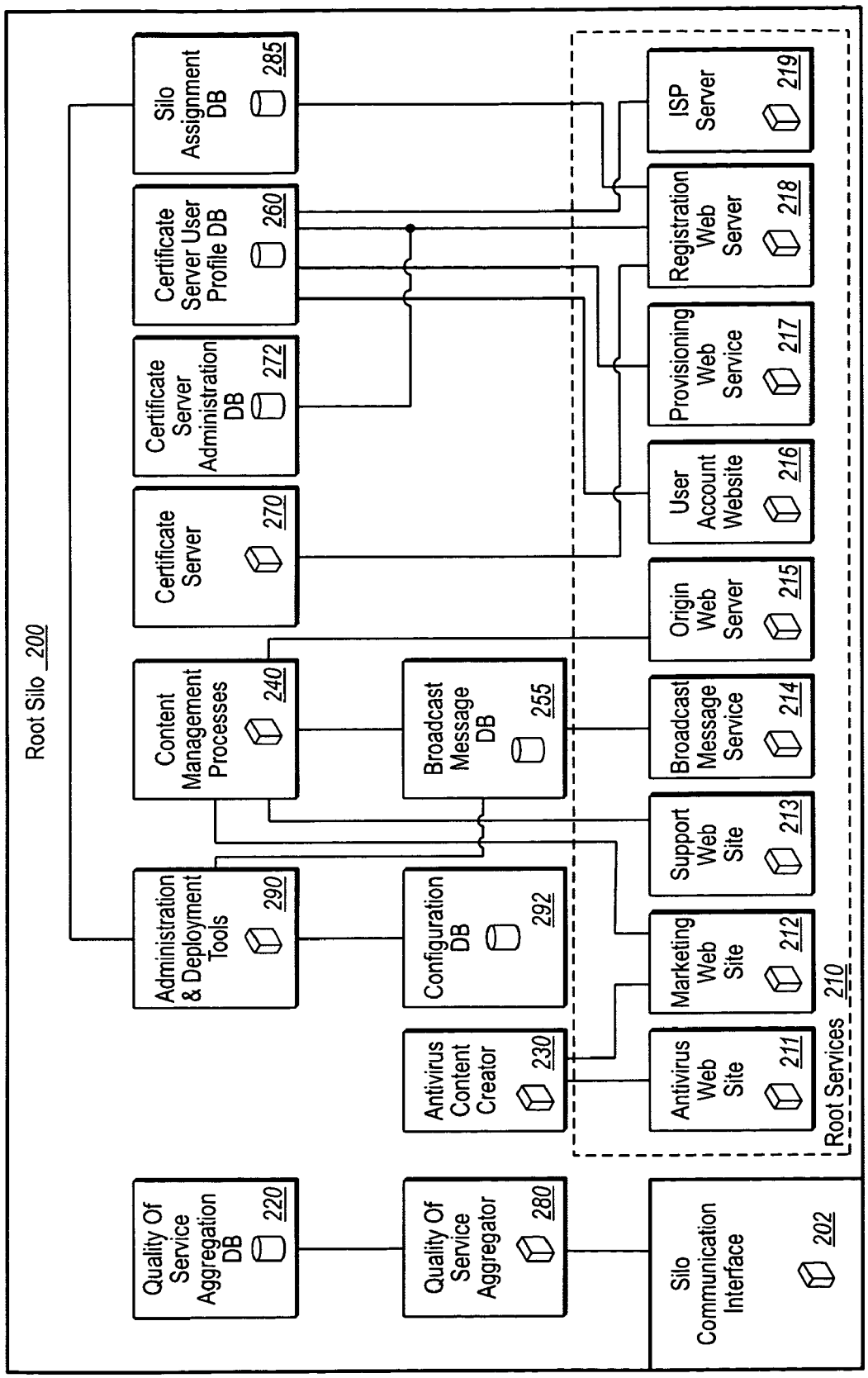
FIG. 2 is a block diagram of components within the example root silo illustrated in FIG. 1.

FIG. 2 is a block diagram of components within the example root silo 200 illustrated in FIG. 1, including a variety of root services 210.

Root silo 200 provides a central location for all registration information (certificate server user profile db 260) as well as a provisioning map or silo assignment db 285 for all active clients. Root silo 200 also serves as an interface to a subscription platform system 180 (see FIG. 1) that communicates with registration web sever 218 and ISP server 219 to perform billing related activities. The root silo's entitlement system. including user account web site 216, provisioning web service 217, registration web server 218, ISP server 219, certificate server 270, certificate server administration dbs 272, certificate server user profile dbs 260, and silo assignment db 285, is responsible for issuing, at provisioning time, and managing, the digital certificates used by the clients. It is also the ultimate authority on managing the authorization/registration of servicing silos and controlling new client distribution to those servicing silos.

A client's relationship with the root silo 200 is primarily that of its initial provisioning (during installation, for example) and for subscription conversion/renewal. From a servicing perspective, clients communicate relatively infrequently (compared to the communication between the client and the clients assigned servicing silo) with the root silo. Because the root silo 200 is the gateway for all service access, its availability for provisioning is important.

A content management process 240 manages content at the origin web server 215, the support web site 213 with web pages and information for contacting customer support, and the marketing web site 212. Note that the content cached in distributed edge cache server 190 may originate at origin web server 215 and the content of virus definition service 170 may originate at marketing web site 212. Although not shown in FIG. 4, a web site similar to support web site 213 may be included in servicing silo 400.

Because broadcasting is essentially servicing silo independent, a broadcast message service 214 and broadcast message db 255 under the control of administration and deployment tools 290 may be part of the root silo 200. Alternatively, broadcast messaging may be implemented within individual servicing silos.

Antivirus content creator 230 controls antivirus web site 211 and to some extent the content available at marketing web site 212.

Root silo 200 may include a certain administrative features in the form of a quality of service aggregator 282 and a quality of service aggregation db 220 that receive quality of service ("QoS") and quality improvement plan ("QIP") data through silo communication interface 202 from a servicing silo that has aggregated the data for the clients serviced by the servicing silo. Quality of service aggregator 282 performs a second level of aggregation by aggregating the QoS and QIP data for the all servicing silos.

Root silo 200 includes administration and development tools 290. Among other things, administration and development tools 290 provides monitoring and content management services for the root silo and the servicing silos. The administration and deployment tools 290 does not provide direct servicing to clients, but rather collects service related events, provides a view of QoS and QIP aggregated telemetry data, and publishing new content (web content, antivirus signatures, firewall policies, alerts from analysis, etc.) to the servicing silos for distribution to the clients. This monitoring is particularly relevant when servicing silos are federated, since the overall quality of service is an important component that spans all silos. Configuration db 292 stores the administration and development tools setting for root silo 200.

III. Example Client Components

Figure 3:
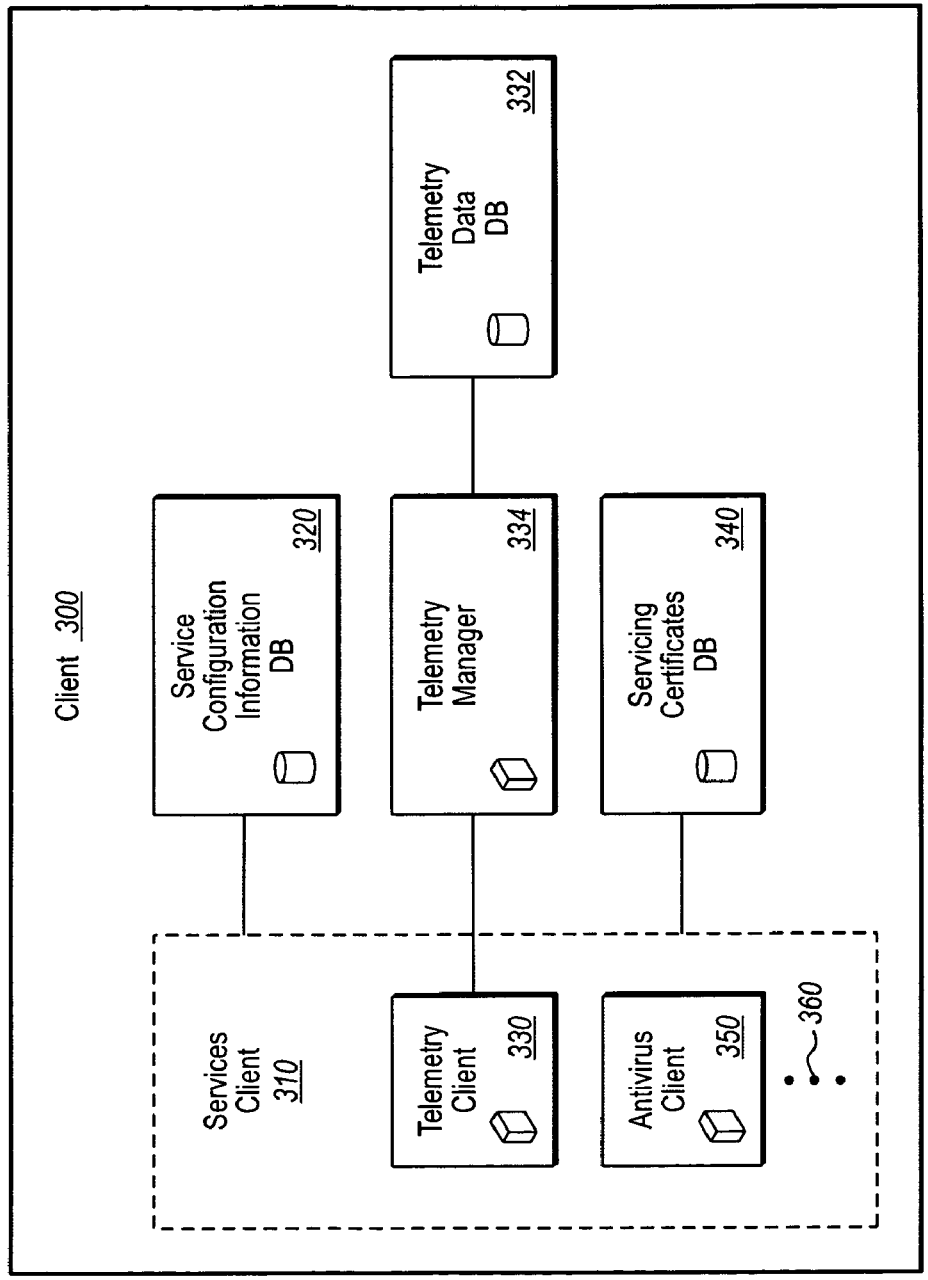
FIG. 3 is a block diagram of components within the example client illustrated in FIG. 1.

FIG. 3 is a block diagram of components within the example client 300 illustrated in FIG. 1, including a variety of services clients 310, such as telemetry client 330, antivirus client 350, and other clients 360.

The digital certificate issued by the root silo's entitlement system controls the servicing silo to which a client is assigned. However, each silo usually has additional configuration information related to the services hosted within the silo. This servicing silo configuration information may comprise an eXensible Markup Language ("XML") fragment that is signed by the servicing silo's key. Having separate servicing silo configuration information allows the servicing silo's operators to manage the configurations of the services hosted within the silo in a dynamic manner. For example, the frequency of the client's heartbeat or the uniform resource locator/address for uploading telemetry data may be dynamically configured. Because the XML configuration is digitally signed, the client is able to verify that the configuration information has not been altered.

The servicing silo configuration information is installed on the client as part of the provisioning process in service configuration information db 320. At service startup, the client loads the digital certificate assigned to it by the root silo and stored in servicing certificate(s) db 340, and then checks to see if it has the corresponding service silo configuration information. If not, which is the case during installation, the client sends a signed request to the servicing silo for its configuration information. The returned silo configuration information is verified, and then stored locally in service configuration information db 320. When the client loads the servicing silo configuration information, it verifies the signature on the file before accepting any of its parameters. Error conditions may be handled by a set of default configuration settings as well as additional attempts to contact the assigned servicing silo or the root silo.

Telemetry client 330 and telemetry manager 334 allow for the collection of telemetry data from client 300. Among other things, telemetry manager 334 uses service configuration information db 320 to determine what telemetry data should be collected and stored in telemetry data db 332 as well as how often the telemetry data should be uploaded to the servicing silo.

Antivirus client 350 determines whether antivirus software at client 300 is up to date and downloads new antivirus software from a servicing silo as appropriate. The status of the antivirus software also may be included in the telemetry data as an indication of the state of the machine, independent of the update feature provided by antivirus client 350.

A variety of other clients 360 may be developed for the distributed service delivery model in general and for client 300 in particular. The present invention is not necessarily limited to any particular services, but rather is directed toward the distributed service delivery model that allows services to be developed and deployed in an effective manner.

IV. Example Servicing Silo Components

Figure 4:
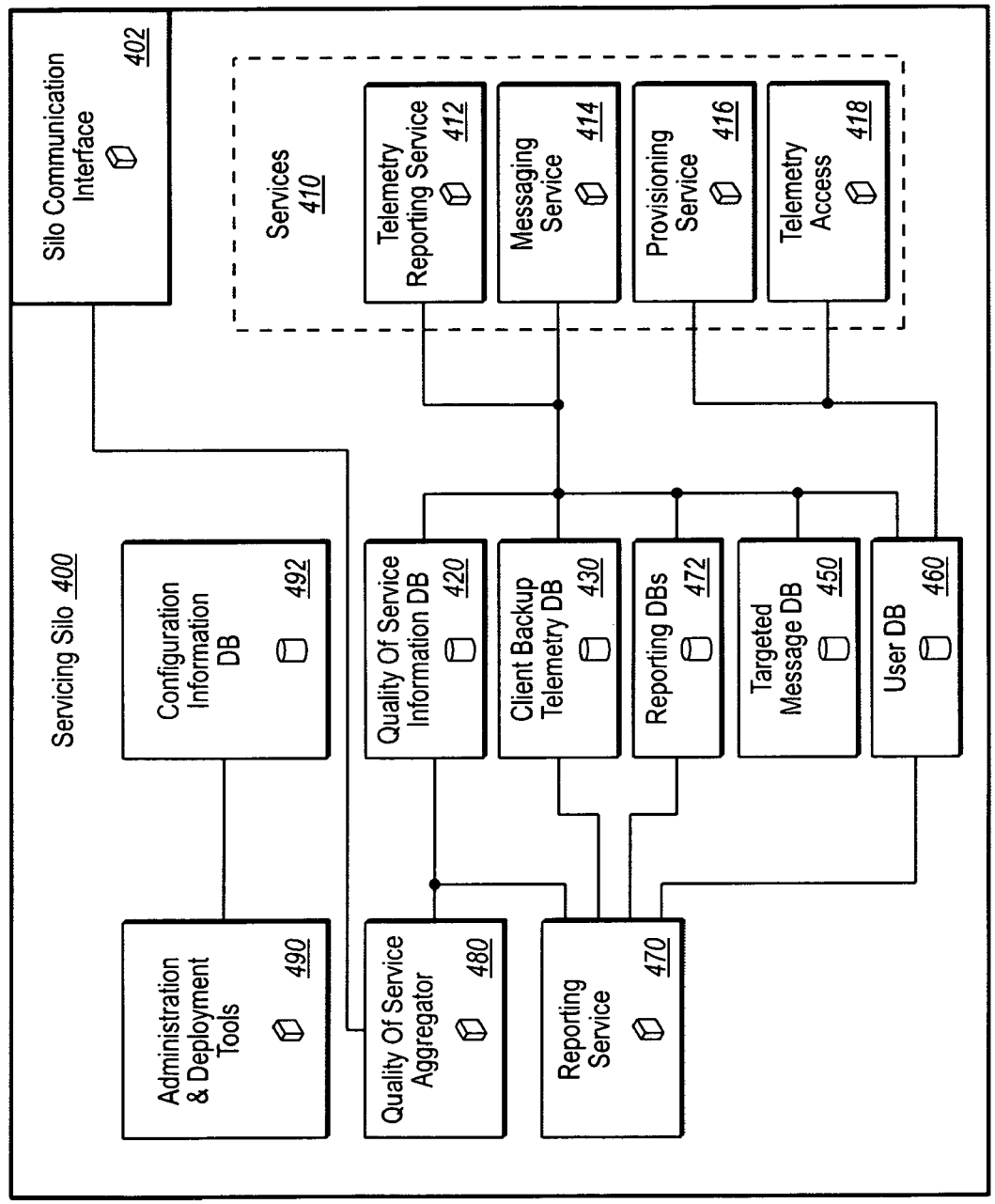
FIG. 4 is a block diagram of components within the example servicing silo illustrated in FIG. 1.

FIG. 4 is a block diagram of components within the example servicing silo 400 illustrated in FIG. 1. The servicing silo contains many of the system services to which clients communicate on a regular basis. As a result, the servicing silo 400 is responsible for scaling out the servicing features. In conjunction with the root silo, this scale-out can be managed by controlling the servicing silos to which clients are assigned. Within the servicing silo 400, the design focuses on keeping the implementation of all services as simple as possible. Because the scale-out is managed at a macro level by the root silo at provisioning time, it is possible to avoid complicated meta indexing server based requirements that introduce additional points of failure and scalability issues. The result is simple and straight forward design logic within the servicing silo. The operation of servicing silo 400 is controlled through administration and deployment tools 490 and configuration information db 492.

Multiple servicing silos allows for better management when hosting multiple versions of the service software simultaneously, such as when managing beta and production servicing silos for a service at the same time. For reasons of scale, performance, and availability, certain types of content like client install and update bits, antivirus signature updates, and firewall policies are distributed from one or more distributed edge cache servers 190, as illustrated in FIG. 1.

The servicing silo 400 hosts a variety of services 410, including a telemetry reporting service 412, a messaging service 414, a provisioning service 416, and a telemetry access service 418. Telemetry reporting service 412 is responsible for allowing clients to upload telemetry data and for providing the data pipes/storage for processing this information. The resulting databases (e.g., client backup telemetry db 430) are used to support a machine view, third party support notifications, and aggregation data reporting.

A reporting service 470 derives quality of service ("QoS") and quality improvement program ("QIP") data from telemetry data reported to the servicing silo 400 and stored in client backup telemetry db 430. The reporting service 470 stores the QoS and QIP data in QoS information db 420 and quality of service aggregator 480 forwards an aggregated view of the data to an administrative tool, either within the root silo or as a separate silo, through silo communication interface 402. Reporting dbs 472 stores other types of reports for the reporting service 470.

Messaging service 414 includes general or broadcast messaging, such as for antivirus signature updates or other critical updates and targeted messaging for service termination. Targeted messages are stored in targeted message db 450. Note that because broadcasting is essentially servicing silo independent, a broadcast message service 214 and broadcast message db 255 may be part of the root silo 200, as shown in FIG. 2.

Provisioning service 416 is responsible for client provisioning and client configuration. Client provisioning includes handling provisioning messages sent from the root silo through the client at service install time, and primarily involves allocating and initializing storage for a new client within the servicing silo, such as within user db 460. Client configuration includes handling requests form clients for configuration information, such as a heartbeat frequency, uniform resource locator ("URL") or location for heartbeats, and a URL for telemetry upload. The servicing silo returns configuration information to the client as a signed XML fragment.

Telemetry access 418 is responsible for providing a view of a machine's telemetry data, under access control, and notification of a third party support entity as triggered by the arrival of certain types of telemetry data.

Servicing silo 400 also supports services for moving a client and the associated machine histories between servicing silos using silo communication interface 402 when initiated by the request of the root silo.

V. Example Hardware Environment

FIG. 5 and the following discussion are intended to provide a brief, general description of a suitable computing environment in which the invention may be implemented. Although not required, the invention will be described in the general context of computer-executable instructions, such as program modules or software components, being executed by computers in network environments. Generally, program modules or software components include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMS, ROMs, and the like.

Program code means comprising one or more program modules may be stored on the magnetic hard disk 539, removable magnetic disk 529, removable optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections or interfaces shown are exemplary and other means of establishing communications over wide area network 552 may be used.

We claim:

1. For a distributed computer system comprising one or more clients, one or more servicing silos that provide one or more services to the one or more clients, and a root silo that authorizes the one or more clients to access the one or more services at the one or more servicing silos, a method of identifying a servicing silo as a provider of a service desired by a client and entitling the client to interact with the servicing silo, without requiring the client to authenticate to the root silo each time the client interacts with the service at the servicing silo, the method comprising the root silo performing acts of:

receiving at the root silo a request from the client for interaction with a service, wherein a plurality of instances of the service run on a plurality of servicing silos;

the root silo selecting one of the plurality of servicing silos which run an instance of the requested service as an available provider of the service for interacting with the client;

generating a servicing certificate that contains (i) service entitlement information showing that the client is entitled to interact with the service at the selected servicing silo, (ii) location information identifying a location of the selected servicing silo, and (iii) one or more keys for use in secure communication between the client and the selected servicing silo;

sending the servicing certificate to the client such that the client stores the servicing certificate and uses the servicing certificate to interact with the service at the selected servicing silo using the location information specified in the servicing certificate, wherein interacting with the service comprises the client, subsequent to receiving the servicing certificate, providing the service entitlement information to the service showing that the client is entitled to interact with the service at the selected servicing silo without requiring the client to authenticate to the root silo each time the client interacts with the service at the selected servicing silo;

determining by the root silo that the client should be moved from the first servicing silo as a result of one of:
the first servicing silo not operating according to agreed standards, or
the addition of one or more new servicing silos that run an instance of the requested service;

selecting by the root silo a second servicing silo of the plurality of servicing silos that run an instance of the requested service as an available provider of the service for interacting with the client;

generating a second servicing certificate that contains (i) service entitlement information showing that the client is entitled to interact with the instance of the requested service at a second servicing silo, (ii) location information identifying a location of the second servicing silo, and (iii) one or more keys for use in secure communication between the client and the second servicing silo; and sending the second servicing certificate to the client for the client to use when interacting with the service at the second servicing silo, in order to move the client from the first servicing silo to the second servicing silo.

2. A method as recited in claim 1, wherein the servicing certificate contains expiration information defining a term during which the client is authorized to interact with the service.

3. A method as recited in claim 1, wherein one of the plurality of servicing silos is identified as an available provider of the service based at least in part on a geographic location of the client.

4. A method as recited in claim 1, wherein the request from the client for interaction with the service is an initial request for interaction with the service.

5. A method as recited in claim 1, wherein the request includes personally identifiable information needed from the client in order to interact with the service, the method further comprising acts of:
storing the personally identifiable information received from the client; and
using the personally identifiable information in connection with billing for the client's interaction with the service, without having to provide the personally identifiable information to the selected servicing silo.

6. The method of claim 1, wherein the instance of the service that runs on the selected servicing silo is a beta version of the service whereas at least one of the instances of the service that run on the plurality of servicing silos is a production version.

7. A computer program product for use in a distributed computer system comprising one or more clients, one or more servicing silos that provide one or more services to the one or more clients, a root silo that authorizes the one or more clients to access the one or more services at the one or more servicing silos, the computer program product comprising one or more memory modules storing computer executable instructions that implement a method of identifying a servicing silo as a provider of a service desired by a client and entitling a client to interact with a servicing silo, without requiring the client to authenticate to the root silo each time the client interacts with the service at the servicing silo, the method comprising the client performing steps for:
directing a request for interaction with a service to the root silo such that the root silo selects one of a plurality of servicing silos which run an instance of the requested service as an available provider of the service for interacting with the client;
acquiring and storing a servicing certificate from the root silo that contains (i) service entitlement information showing that the client is entitled to interact with the service at the selected servicing silo, (ii) location information identifying a location of the selected servicing silo, and (iii) one or more keys for use in secure communication between the client and the selected servicing silo;
directing a request to the selected servicing silo for interaction with the service using the location information in the servicing certificate acquired from the root silo;
providing at least the entitlement information to the selected servicing silo to show that the client is entitled to interact with the service at the selected servicing silo;
interacting with the service at the selected servicing silo, wherein interacting with the service comprises, subsequent to receiving the servicing certificate, providing the service entitlement information to the service showing that the client is entitled to interact with the service at the selected servicing silo without requiring the client to authenticate to the root silo each time the client interacts with the service at the selected servicing silo;
acquiring and storing a second servicing certificate from the root silo that contains (i) service entitlement information showing that the client is entitled to interact with an instance of the requested service at a second servicing silo, (ii) location information identifying a location of the second servicing silo, and (iii) one or more keys for use in secure communication between the client and the second servicing silo, wherein the second servicing certificate is generated by the root silo in response to a determination that the client should be moved from the first servicing silo to the second servicing silo as a result of one of:
the first servicing silo not operating according to agreed standards, or
the addition of one or more new servicing silos that run an instance of the requested service; and
interacting with the service at the second servicing silo, wherein interacting with the service comprises, subsequent to receiving the second servicing certificate, providing the service entitlement information to the service showing that the client is entitled to interact with the service at the second servicing silo without requiring the client to authenticate to the root silo each time the client interacts with the service at the second servicing silo.

8. A computer program product as recited in claim 7, the method further comprising:
the client requesting client configuration information from the selected servicing silo, the configuration information corresponding to the instance of the service that runs on the selected servicing silo; and
the client receiving client configuration information from the selected servicing silo in order to configure the client for interaction with the service on the selected servicing silo.

9. A computer program product as recited in claim 7, wherein interacting with the service at the selected servicing silo comprises sending client telemetry data to the service for analysis.

10. A computer program product as recited in claim 7, wherein the service comprises an antivirus service, and wherein interacting with the service comprises updating antivirus software located at the client.

11. A computer program product as recited in claim 7, wherein the servicing certificate contains expiration information, and wherein the request to the root silo for interaction with the service comprises a request to renew a servicing certificate in order to extend the expiration information.

12. A computer program product as recited in claim 7, wherein the one or more keys comprise a public/private key pair.

13. A computer program product as recited in claim 7, wherein the service includes multiple service levels, and wherein the servicing certificate contains an identifier for a particular service level to which the client is entitled.

14. In a distributed computer system comprising one or more clients, a plurality of servicing silos that provide one or more services to the one or more clients, and a root silo that authorizes the one or more clients to access the one or more services at the plurality of servicing silos without requiring the one or more clients to authenticate to the root silo each time the one or more clients interact with the one or more services at the plurality of servicing silos, each servicing silo comprising:
a network interface for communicating with the one or more clients;

one or more memory modules storing computer executable instructions, the computer executable instructions comprising:

computer executable instructions for receiving provisioning data created by the root silo indicating that the servicing silo should allocate and initialize storage for the client, the provisioning data being received from the client, wherein the servicing silo runs an instance of a service that is requested by the client, and wherein the servicing silo is selected by the root silo from among a plurality of servicing silos that each run an instance of the requested service as an available provider of the service for interacting with the client, wherein a different servicing silo of the plurality of servicing silos was previously servicing the client prior to the client selecting the servicing silo to service the client, and wherein the servicing silo is selected by the root silo to service the client based on one of:

the different servicing silo not operating according to agreed standards, or the addition of the servicing silo to the plurality of servicing silos that each run an instance of the requested service;

computer executable instructions for receiving a servicing certificate created by the root silo which is different from a prior servicing certificate that was assigned to the client to access the different servicing silo, the servicing certificate containing (i) service entitlement information showing that the root silo authorized the client to interact with the instance of the service at the servicing silo, (ii) location information identifying a location of the servicing silo, and (iii) one or more keys for use in secure communication between the client and the servicing silo;

computer executable instructions for implementing at least a portion of the service; and computer executable instructions for interacting with the client in accordance with the service, wherein interacting with the client comprises receiving the service entitlement information from the client showing that the root silo authorized the client to interact with the service without requiring the client to authenticate to the root silo each time the client interacts with the service at the servicing silo; and a processing unit coupled to the network connection and the one or more memory modules for sending and receiving data over the network connection and for executing the computer executable instructions.

15. A servicing silo as recited in claim 14, the computer executable instructions further comprising:

computer executable instructions for receiving telemetry data from the client;

computer executable instructions for aggregating the telemetry data; and computer executable instructions for forwarding the aggregated telemetry data to an administrative silo for analysis.

16. A servicing silo as recited in claim 15, the computer executable instructions further comprising computer executable instructions for providing a machine view of the telemetry data received from the client.

17. A servicing silo as recited in claim 15, the computer executable instructions further comprising:

computer executable instructions for associating a third party support entity with the client;

computer executable instructions for analyzing the telemetry data; and computer executable instructions for notifying the third party support entity of one or more support issues identified while analyzing the telemetry data.

18. A servicing silo as recited in claim 15, wherein the telemetry data is formatted in eXtensible Markup Language ("XML") and signed by at least one of the one or more keys to show that the telemetry data was sent by the client.

19. A servicing silo as recited in claim 14, the computer executable instructions further comprising:

computer executable instructions for sending broadcast messages to a plurality of clients authorized to interact with the service at the servicing silo; and computer executable instructions for sending targeted messages to one or more individual clients authorized to interact with the service at the servicing silo.

* * * * *